United States Patent [19]
Roos et al.

[11] Patent Number: 5,467,092
[45] Date of Patent: Nov. 14, 1995

[54] RADAR SYSTEM INCLUDING STABILIZATION CALIBRATION ARRANGEMENT

[75] Inventors: Mark G. Roos, Shawnee; Terry K. Michie, Olathe, both of Kans.

[73] Assignee: AlliedSignal Inc., Morris Township, N.J.

[21] Appl. No.: 251,435

[22] Filed: May 31, 1994

[51] Int. Cl.[6] ............................................. G01S 7/40
[52] U.S. Cl. ................................. 342/174; 342/165
[58] Field of Search ............................. 342/165, 174, 342/173, 25, 77, 75, 74

[56] References Cited

U.S. PATENT DOCUMENTS

| | | | |
|---|---|---|---|
| 4,148,029 | 4/1979 | Quesinberry | 343/9 |
| 4,204,210 | 5/1980 | Hose | 342/25 |
| 4,546,355 | 10/1985 | Boles | 343/17 |
| 4,589,610 | 5/1986 | Schmidt | 244/3.19 |
| 4,803,490 | 2/1989 | Kruger | 342/158 |
| 5,339,080 | 8/1994 | Steinway et al. | 342/22 |

*Primary Examiner*—Charles T. Jordan
*Assistant Examiner*—Christopher K. Montgomery
*Attorney, Agent, or Firm*—Howard G. Massung

[57] ABSTRACT

A radar system includes a stabilization calibration arrangement wherein a module stores particular parameters for relating the radar system to a gyro which provides stabilizing data for the radar system. The storage module, the radar system and the gyro are mounted on the same mounting platform so that the particular calibration features remain with the mounting platform. With the arrangement described, the radar system is independent of the gyro and can be of a generic configuration as is advantageous for stabilization calibration purposes.

10 Claims, 3 Drawing Sheets

RADAR SYSTEM INCLUDING STABILIZATION CALIBRATION ARRANGEMENT

BACKGROUND OF THE INVENTION

This invention relates to a ground referenced stabilization arrangement for a radar system. More particularly, this invention relates to an arrangement for calibrating a radar system to a mounting platform gyroscope (gyro). Still more particularly, this invention relates to facilitating recalibrating the radar system each time the system is exchanged for maintenance or repair, or replaced, as the case may be.

When a radar system is mounted to an unsteady platform, such as a ship or an aircraft, it is desirable to properly compensate the pointing of the antenna for motion of the unsteady platform. The system antenna must be positioned so that the radar beam remains pointed at a target when the platform moves. When, for example, an aircraft is in a roll or pitch maneuver, the radar beam will be directed into the ground at certain points without proper stabilization. This can cause ground reflections to be confused with desired targets, such as other aircraft or weather formations.

A stabilization arrangement typically includes a gyro mounted to the same platform as the radar system. The radar system reads angular information provided by the gyro and provides inputs which are used to determine a required calibrating displacement to be applied to the radar system antenna. For the stabilization arrangement to work properly, the gyro outputs must be particularly calibrated to the radar system. In the typical stabilization arrangement, these particular calibrations are made directly to the radar system. Therefore, when the radar system is exchanged or replaced for one reason or another as is often the case, the calibration procedure must be repeated. This procedure involves mounting the gyro on a controlled mounting surface and adjusting radar system parameters such as, for example, pitch gain, pitch offset, roll gain and roll offset. This repeated calibration is costly, time consuming and disruptive as in the case of removing a sealed radome on an aircraft to perform the calibration, as will be appreciated.

SUMMARY OF THE INVENTION

It is an object of this invention to provide a calibration arrangement for stabilizing a radar system that eliminates the requirement to recalibrate the system with a gyro when the system is exchanged or replaced.

It is another object of this invention to provide a radar system that can be externally commanded so that the radar antenna beam is properly pointed in response to particular gyro parameters without the need to internally adjust the radar system.

It is yet another object of this invention to provide means for retaining particular stabilization calibration parameters for commanding a radar system to provide proper radar antenna beam pointing.

It is a further object of this invention to provide a calibration arrangement for stabilizing a radar system, wherein in-motion calibration is achievable.

In accordance with the above objects, a preferred embodiment of the invention features a configuration module which stores particular data that allows a radar system to be related to a gyro. The data is stored in a digital format for ease of transmission and for high integrity. The storage media is non-volatile so that power need not be available for retention. The configuration module is mounted to a platform (aircraft or ship, for example) with the radar system and the gyro so that the calibration feature remains with said platform.

In an invention of the type described the radar system is arranged so that there is minimal variation in stabilization performance from system to system. Further, a remote calibration capability is provided so that, for example, when the mounting platform is an aircraft, in-flight calibration is possible to compensate for mounting tolerances, flight attitude differences, etc. The radar indicator, which contains pertinent controls, is designed so that a particular operating sequence of the controls allows an operator to perform the calibration procedure without internal access to the radar system.

DETAILED DESCRIPTION OF THE INVENTION

Figure 1:
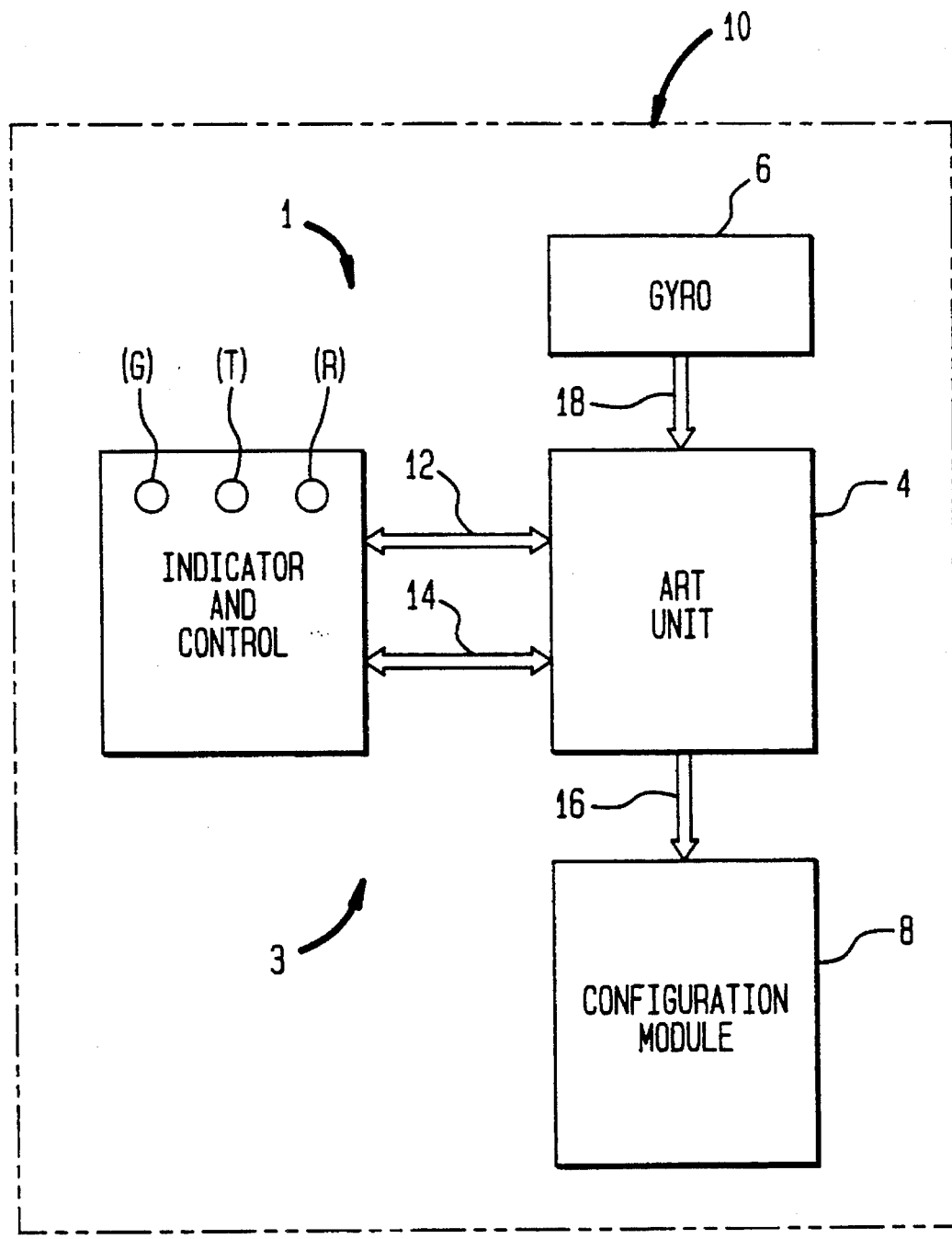
FIG. 1 is a diagrammatic representation generally illustrating an indicator and control panel, a gyro, an antenna/receiver/transmitter (ART) unit and a configuration module arranged according to the invention.

With reference to FIG. 1, a calibration arrangement for stabilizing a radar system according to the present invention is designated by the numeral 1 and generally includes an indicator and control panel 2, an antenna receiver/transmitter (ART) unit 4 driven by inputs from a gyroscope (gyro) 6, and a configuration module 8 which receives inputs from and applies outputs to ART unit 4. Arrangement 1 is mounted on a platform such as a ship or aircraft 10. Units 2 and 4 are part of a radar system 3.

Indicator and control panel 2 displays radar detected targets, weather, etc., and also displays data relating to the stabilization calibration of the radar system. Radar controls on unit 2 such as gain (G), tilt (T) and range (R) are also used to set stabilization calibration parameters such as, for example, pitch gain and roll offset.

Antenna/receiver/transmitter (ART) unit 4 is configured for digitally setting calibration parameters to interface with gyro 6. ART unit 4 communicates with indicator and control panel unit 2 by responding to data transmitted over a serial control bus 12 for transmitting data to unit 2 over a serial display data bus 14.

Configuration module 8 stores particular digital stabilization data such that units 2 and 4 can be of a generic configuration. Configuration module 8, which always remains with platform 10, communicates with ART unit 4 via a digital bi-directional serial bus 16.

Stabilization calibration is accomplished by an operator making adjustments to ART unit 4 via controls (G), (T) and (R) on panel 2. ART unit 4 responds by applying gain, offset and configuration data via bus 16 to configuration module 8 for storage. To initiate the procedure, arrangement 1 is rendered in a "test" mode. A predetermined combination of the range (R), tilt (T) and gain (G) controls on unit 2 enables a "calibrate" mode. Once in the "calibrate" mode, gain control (G) is used to select the calibration parameter (roll gain for example) and tilt control (T) is used to make a required adjustment (more or less roll gain, for example).

The calibration procedure is prompted on panel 2 so that an operator can monitor a parameter as it is adjusted. Finally, gain (G) and tilt (T) controls are set to a specific set of values and the parameters are all stored. The advantage of this procedure is that ART unit 4 is not physically adjusted, i.e. it remains in a generic configuration. Also, the procedure can be accomplished in-flight when the mounting platform is an aircraft, which allows fine tuning of the stabilization performance.

Figure 2:
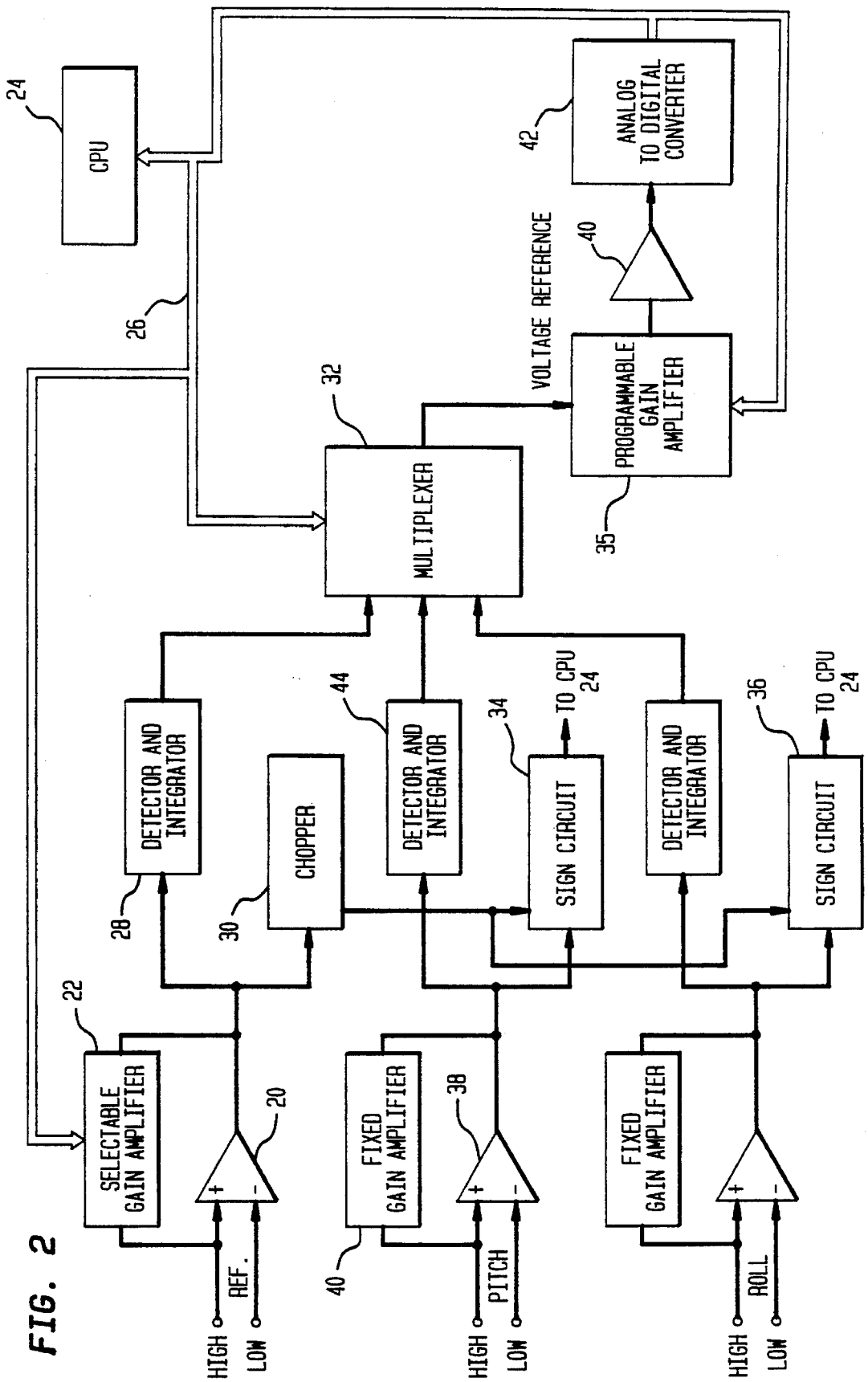
FIG. 2 is a block diagram of an ART unit configuration for receiving gyro inputs according to the invention.

FIG. 2 illustrates that portion of ART unit 4 which receives inputs from gyro 6. Gyro 6 provides analog inputs to ART unit 4 via a gyro output bus 18 (FIG. 1). These analog inputs are 400 Hz reference, pitch and roll inputs. There are numerous gyro systems with which ART unit 4 must interface. Each of these systems will have varying parameters from mounting platform to mounting platform.

The gyro reference input can vary from 10 Vrms ("LO") to 115 Vrms ("HI"). The gyro reference input circuitry therefore includes a switchable gain amplifier so that the same level of reference voltage may be detected.

The gyro pitch and roll inputs can vary from 10 millivolts per degree ("LO") to 220 millivolts per degree ("HI"). The pitch and roll inputs are applied to fixed gain amplifiers and then detected. The reference, pitch and roll detected outputs are integrated and multiplexed to a programmable gain amplifier. The gain values for the programmable gain amplifier are stored in configuration module 8 and applied to the programmable gain amplifier when the appropriate input is selected.

The pitch and roll data is multiplexed by a central processing unit (CPU) to an A/D converter and then read by the CPU. The pitch and roll data is used to determine the appropriate tilt angle of the radar antenna in accordance with a current azimuth setting. Pitch and roll offsets are stored in configuration module 8. Once a tilt angle has been determined, then the CPU will determine if the tilt of the antenna should be increased or decreased. The CPU, in a fixed interrupt time, will instruct an azimuth drive device (not otherwise shown) and a pitch drive device (not otherwise shown) to step their respective motors accordingly.

With specific reference now to FIG. 2, a reference input from gyro 6 is applied to the differential input of an operational amplifier 20. Since the reference input has a large range as aforenoted, amplifier 20 has a switchable gain. Configuration module 8 contains data relating to which range of reference inputs will be applied to ART unit 4. There are typically three different selections, which consist of, for example, 115v, 26v and 10v. A selected gain for this purpose from a selectable gain amplifier 22 is selected by CPU 24 via a data bus 26.

Once a reference gain has been established at the differential input of amplifier 20, a signal will be applied by the amplifier to a detector and integrator 28, and to a chopper 30. The detector and integrator converts the sine wave output from amplifier 20 to a DC value. This DC value is multiplexed by a multiplexer 32 and applied therefrom to a programmable gain amplifier 35.

Amplifier 20 drives chopper 30, the output of which is used in pitch and roll sign circuits 34 and 36 to determine the phase of pitch or roll inputs from gyro 6. If the pitch input from gyro 6 is in phase with the reference input, platform 10 (FIG. 1) is pitched upward. If the pitch input is 180 degrees out of phase with the reference input, the platform is pitched downward. When the roll input is in phase with the reference, the platform is in a right roll, and when the roll input is 180 degrees out of phase with the reference, the platform is in a left roll.

Since the pitch and roll channels shown in FIG. 2 are identical, only the pitch channel will be discussed herein for purposes of simplicity.

Thus, the analog pitch input from gyro 6 is applied to the differential input of an operational amplifier 38 (fixed gain via 40). The output of amplifier 38 is applied to a detector and integrator 44 and to sign circuit 34. Detector and integrator 44 converts the analog sign wave from amplifier 38 to a DC value. This value is then multiplexed via multiplexer 32 and applied to programmable gain amplifier 35.

Sign circuit 34 includes a saturation amplifier, whereby the output of amplifier 38 goes rail to rail. The rail to rail output is chopped by chopper 30. If the pitch input from gyro 6 is in phase with the reference input from the gyro, the output from sign circuit 34 is a positive value. This positive value is applied to CPU 24. If the pitch input is out of phase with the reference input, then a negative value will be provided by the chopper, and a low value will be applied to CPU 24.

Thus, all three analog AC inputs from gyro 6, i.e. reference, pitch and roll, are rectified and integrated. The resulting DC values are multiplexed via multiplexer 32 and applied to programmable gain amplifier 35. Programmable gain amplifier 35 includes a 10 bit D/A converter, a unity gain operational amplifier and a "gain of 3" operational amplifier. The total gain of programmable gain amplifier 35 varies, for example, from 0 to 3 in 1024 steps.

The multiplexed DC value from programmable gain amplifier 35 is applied to a fixed gain amplifier 40. The multiplexed signals will be either amplified or attenuated by amplifier 40 depending upon digital data stored in configuration module 8. When gyro 6 is being calibrated, the digital values applied to the programmable gain amplifier are varied until the desired gain is achieved. The output from the programmable gain amplifier is applied to a multiplexed A/D converter 42.

The analog gyro data is multiplexed to A/D converter 42 by CPU 24. Prior to reading multiplexed A/D converter 42, CPU 24 selects either the reference, pitch or roll inputs as an input to programmable gain amplifier 35. CPU 24 adjusts the gain of programmable gain amplifier 35. CPU 24 selects the output of programmable gain amplifier 35 as an input to A/D converter 42. The CPU will then read the data from the A/D converter and then determine required stabilization parameters.

Figure 3:
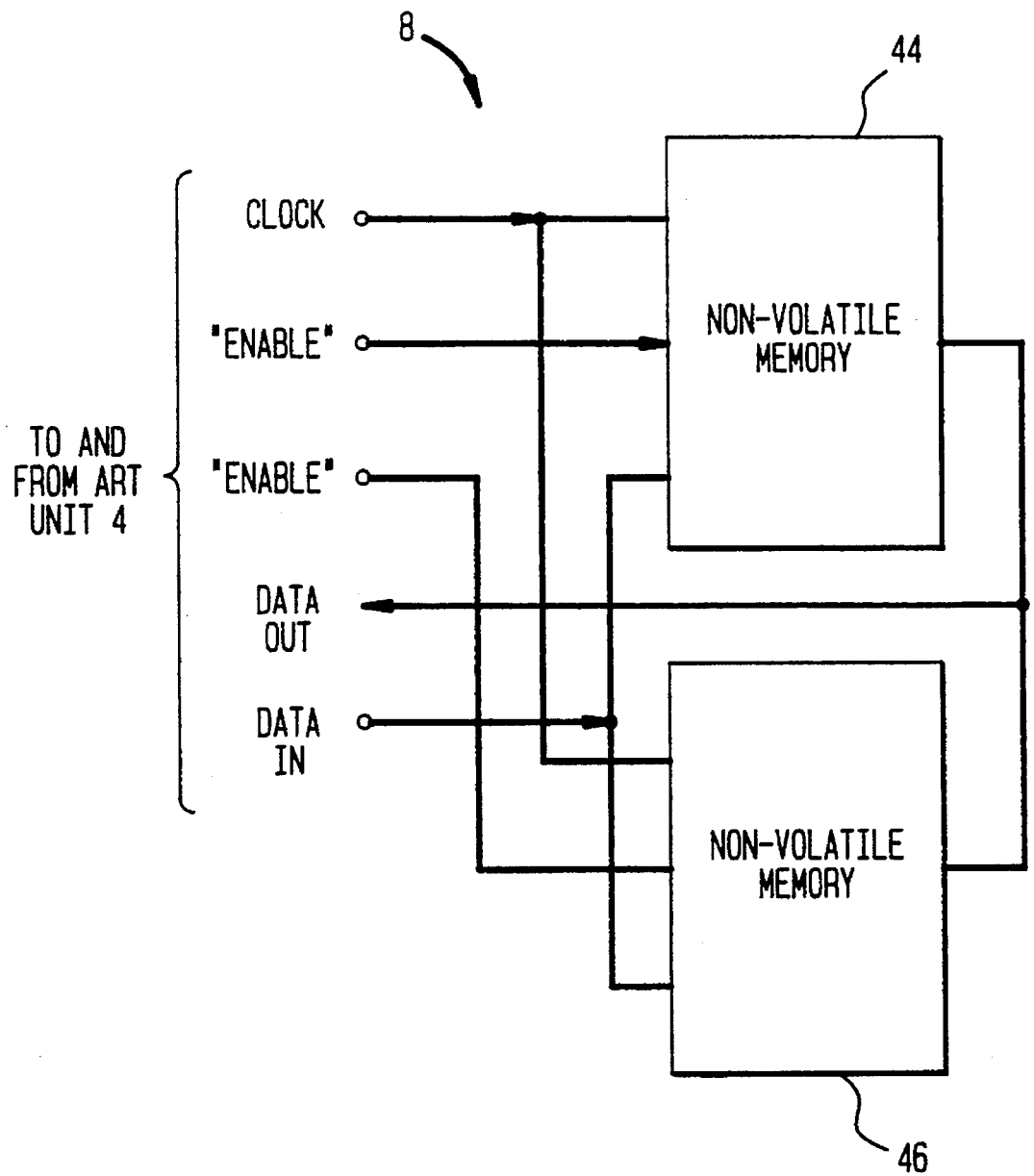
FIG. 3 is a block diagram of a configuration module according to the invention.

FIG. 3 more particularly illustrates configuration module 8. Digital serial data is both written to and read from non-volatile memories 44 and 46. Two such memories are used to compare to each other to help protect data integrity. The following data is stored for purposes of stabilization: reference amplitude; reference gain; pitch gain; pitch offset; roll gain; and roll offset.

The data is written to or read from configuration module 8 by CPU 24 in ART unit 4. A serial digital signal (data in) is applied in synchronism with a clock signal. Each memory 44 and 46 has an "enable" feature to select which device is being accessed.

There has thus been described and illustrated a calibration arrangement for stabilizing radar system 3 wherein configuration module 8 stores particular data for permitting radar system 3 to be related to gyro 6. The data is stored in a digital format for ease in transmission and high integrity. Configuration module 8 is mounted with radar system 3 and gyro 6 on the same mounting platform so that the particular calibration features remain with the mounting platform as will be recognized as advantageous, particularly when radar system 3 must be exchanged or replaced, as the case may be.

With the above description of the invention in mind, reference is made to the claims appended hereto for a definition of the scope of the invention.

What is claimed is:

1. A radar system including a stabilization calibration arrangement, comprising:

sensing means mounted to a mounting platform for sensing the attitude of the platform and for providing an analog reference signal and analog mounting platform attitude signals;

antenna means mounted to the mounting platform and including means connected to the sensing means and responsive to the analog reference and analog mounting platform attitude signals therefrom for providing digital stabilization calibration signals for commanding the antenna means to point a beam transmitted by said antenna means;

means mounted to the mounting platform and connected to the antenna means for receiving and storing the digital stabilization calibration signals and for applying stored digital stabilization calibration signals to said antenna means, whereby stabilization calibration is achieved so that the radar system and the sensing means are independent of each other;

indicator and control means; and the antenna means connected to the indicator and control means and responsive to control data transmitted by the indicator and controls means for transmitting signals relating to the stabilization calibration of the antenna system to the indicator and control means for displaying said signals.

2. A radar system including a stabilization calibration arrangement, comprising:

sensing means mounted to a mounting platform for sensing the attitude of the platform and for providing an analog reference signal and analog mounting platform attitude signals;

antenna means mounted to the mounting platform and including means connected to the sensing means and responsive to the analog reference and analog mounting platform attitude signals therefrom for providing digital stabilization calibration signals for commanding the antenna means to point a beam transmitted by said antenna means;

means mounted to the mounting platform and connected to the antenna means for receiving and storing the digital stabilization calibration signals and for applying stored digital stabilization calibration signals to said antenna means, whereby stabilization calibration is achieved so that the radar system and the sensing means are independent of each other;

indicator and control means including operator-operated control means for setting stabilization calibration parameters; and the antenna means connected to the indicator and control means and responsive to control data transmitted by the indicator and controls means for transmitting signals relating to the stabilization calibration of the antenna system to the indicator and control means for displaying said signals.

3. A radar system including a stabilization calibration arrangement, comprising:

sensing means mounted to a mounting platform for sensing the attitude of the platform and for providing an analog reference signal and analog mounting platform attitude signals;

antenna means mounted to the mounting platform and including means connected to the sensing means and responsive to the analog reference and analog mounting platform attitude signals therefrom for providing digital stabilization calibration signals for commanding the antenna means to point a beam transmitted by said antenna means;

means mounted to the mounting platform and connected to the antenna means for receiving and storing the digital stabilization calibration signals and for applying stored digital stabilization calibration signals to said antenna means, whereby stabilization calibration is achieved so that the radar system and the sensing means are independent of each other; and said means for providing digital stabilization calibration signals including selectable gain amplifier means connected to the sensing means for receiving the analog reference signal therefrom, and for adjusting the gain thereof to provide a first gain adjusted analog AC signal, first means connected to the selectable gain amplifier means for converting the first gain adjusted analog AC signal to a first analog DC signal, first fixed gain amplifier means connected to the sensing means for receiving a first analog mounting platform attitude signal therefrom and for adjusting the gain thereof to provide a second gain adjusted analog AC signal, second means connected to the first fixed gain amplifier means for converting the second gain adjusted analog AC signal to a second analog DC signal, second fixed gain amplifier means connected to the sensing means for receiving a second analog mounting platform attitude signal therefrom and for adjusting the gain thereof to provide a third gain adjusted analog AC signal, and third means connected to the second fixed gain amplifier means for converting the third gain adjusted analog AC signal to a third analog DC signal.

4. A radar system including a stabilization calibration arrangement, comprising:

sensing means mounted to a mounting platform for sensing the attitude of the platform and for providing an analog reference signal and analog mounting platform attitude signals;

antenna means mounted to the mounting platform and including means connected to the sensing means and responsive to the analog reference and analog mounting platform attitude signals therefrom for providing digital stabilization calibration signals for commanding the antenna means to point a beam transmitted by said antenna means;

means mounted to the mounting platform and connected to the antenna means for receiving and storing the digital stabilization calibration signals and for applying stored digital stabilization calibration signals to said antenna means, whereby stabilization calibration is achieved so that the radar system and the sensing means are independent of each other;

said means for providing digital stabilization calibration signals including selectable gain amplifier means connected to the sensing means for receiving the analog reference signal therefrom, and for adjusting the gain thereof to provide a first gain adjusted analog AC signal, first means connected to the selectable gain amplifier means for converting the first gain adjusted analog AC signal to a first analog DC signal, first fixed gain amplifier means connected to the sensing means for receiving a first analog mounting platform attitude signal therefrom and for adjusting the gain thereof to provide a second gain adjusted analog AC signal, second means connected to the first fixed gain amplifier means for converting the second gain adjusted analog AC signal to a second analog DC signal, second fixed gain amplifier means connected to the sensing means for receiving a second analog mounting platform attitude signal therefrom and for adjusting the gain thereof to provide a third gain adjusted analog AC signal, and third means connected to the second fixed gain amplifier means for converting the third analog gain adjusted AC signal to a third analog DC signal;

multiplexing means connected to the first, second and third means for multiplexing the first, second and third analog DC signals and for providing a multiplexed analog DC signal;

means connected to the multiplexing means for applying a programmable gain to the multiplexed analog DC signal; and means connected to the multiplexing means for converting the multiplexed analog DC signal having the programmable gain applied thereto to a digital signal.

5. A system as described by claim 4, including:

signal processing means connected to the switchable gain amplifier means, the multiplexing means, the programmable gain means and the means for converting the multiplexed analog DC signal having a programmable gain applied thereto to a digital signal;

the signal processing means selecting one of the first, second and third multiplexed signals for application to the programmable gain means, adjusting the gain of the programmable gain means, reading the output from said means for converting the multiplexed analog DC signal having a programmable gain applied thereto to a digital signal and selecting the gain for the selectable gain amplifier means for determining required stabilization calibration parameters.

6. A system as described by claim 5, including:

first comparing means connected to the selectable gain amplifier means and to the first fixed gain amplifier means for comparing the phase of the first gain adjusted AC signal to the phase of the second gain adjusted AC signal and for providing a first output signal indicative of the difference between the compared phases;

second comparing means connected to the selectable gain amplifier means and to the second fixed gain amplifier means for comparing the phase of the first gain adjusted AC signal to the phase of the third gain adjusted AC signal and for providing a second output signal indicative of the difference between the compared phases; and the first and second comparing means connected to the signal processor for applying the respective first and second output signals therefrom to said signal processor.

7. A system as described by claim 6, wherein:

the one attitude parameter of the mounting platform is the pitch thereof;

the mounting platform is pitched upward when the first output signal indicates that the first gain adjusted AC signal is in phase with the second gain adjusted AC signal; and the mounting platform is pitched downward when the first gain adjusted AC signal is 180 degrees out of phase with the second gain adjusted AC signal.

8. A system as described by claim 6, wherein:

the other attitude parameter of the mounting platform is the roll thereof;

the mounting platform is in a right roll when the first gain adjusted AC signal is in phase with the third gain adjusted AC signal; and the mounting platform is in a left roll when the first gain adjusted signal is 180 degrees out of phase with the third gain adjusted signal.

9. A system as described by claim 5, wherein the means mounted to the mounting platform and connected to the antenna means for receiving and storing the digital stabilization calibration signals and for applying stored digital stabilization calibration signals to said antenna means includes:

first and second non-volatile memory means for receiving and storing the digital stabilization calibration signals and for applying stored digital stabilization calibration signals to said antenna means; and said signal processing means being effective for selecting which of the first and second non-volatile memory means is being accessed, whereby the signal processing means controls "writing" and "reading" of the stored digital stabilization calibration signals.

10. A system as described by claim 9, wherein:

the signal processing means applies a clock signal to the storage and applying means whereby data is applied to said means in synchronization with the clock signal.

* * * * *